United States Patent
Gao et al.

(10) Patent No.: US 11,070,272 B2
(45) Date of Patent: *Jul. 20, 2021

(54) MULTI-RESOLUTION CSI FEEDBACK

(71) Applicant: Telefonaktiebolaget LM Ericsson (publ), Stockholm (SE)

(72) Inventors: Shiwei Gao, Nepean (CA); Robert Mark Harrison, Grapevine, TX (US); Siva Muruganathan, Stittsville (CA); Mattias Frenne, Uppsala (SE); Stephen Grant, Pleasanton, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 17 days.

This patent is subject to a terminal disclaimer.

(21) Appl. No.: 16/566,426

(22) Filed: Sep. 10, 2019

(65) Prior Publication Data

US 2020/0007214 A1   Jan. 2, 2020

Related U.S. Application Data

(63) Continuation of application No. 15/543,766, filed as application No. PCT/SE2017/050501 on May 15, 2017, now Pat. No. 10,447,368.

(Continued)

(51) Int. Cl.
*H04B 7/06* (2006.01)
*H04B 17/309* (2015.01)
(Continued)

(52) U.S. Cl.
CPC ......... *H04B 7/0626* (2013.01); *H04B 7/0452* (2013.01); *H04B 7/0456* (2013.01);
(Continued)

(58) Field of Classification Search
CPC .. H04B 17/309; H04B 7/0452; H04B 7/0456; H04B 7/0626; H04B 7/0634;
(Continued)

(56) References Cited

U.S. PATENT DOCUMENTS 9,106,395 B2    8/2015  Lee et al.
9,119,209 B2 *  8/2015  Nam ..................... H04L 1/0053
(Continued)

FOREIGN PATENT DOCUMENTS

CN    102859894 A    1/2013
WO    2014138625 A1  9/2014
(Continued)

OTHER PUBLICATIONS

Author Unknown, "Technical Specification Group Radio Access Network; Evolved Universal Terrestrial Radio Access (E-UTRA); Physical channels and modulation (Release 13)," Technical Specification 36.211, Version 13.0.0, 3GPP Organizational Partners, Dec. 2015, 141 pages.

(Continued)

*Primary Examiner* — Ahmed Elallam
(74) *Attorney, Agent, or Firm* — Withrow & Terranova, PLLC

(57) ABSTRACT

A method performed by a radio device 6 for Channel State Information (CSI) feedback in a communication system 1 comprising a Radio Access Network (RAN) node 3 comprises receiving, from the RAN node, information about a CSI Reference Signal (RS) resource, a first CSI type and a second CSI type for feedback. The method also comprises receiving, from the RAN node, a CSI feedback request for CSI measurement and feedback of the first CSI type or the second CSI type. The method also comprises measuring CSI of the indicated type based on signals received on the CSI-RS resource. The method also comprises sending, to the (Continued)

--- eNB confiures a UE with a CSI-RS resource and two types of CSI reportings based on the CSI-RS resource:
1. The first type is a "CLASS A" codebook based CSI feedback
2. The second is an enhanced CSI feedback with a higher resolution

↓ eNB dynamically triggers CSI feedback by sending a CSI feedback request to a UE including the type of CSI to be fed back to the eNB

↓

When CSI feedback trigger is received by a UE, the UE measures CSI of the indicated type in the configured CSI-RS resource in a subframe associated with the trigger and reports back the measured CSI in a later subframe RAN node, a CSI report of the requested CSI type. A corresponding method in a RAN node is furthermore presented herein.

20 Claims, 6 Drawing Sheets

Related U.S. Application Data

(60) Provisional application No. 62/335,774, filed on May 13, 2016.

(51) Int. Cl.
| | |
|---|---|
| *H04B 7/0452* | (2017.01) |
| *H04B 7/0456* | (2017.01) |
| *H04L 5/00* | (2006.01) |
| *H04W 76/27* | (2018.01) |
| *H04L 25/02* | (2006.01) |

(52) U.S. Cl.
CPC ......... *H04B 7/0634* (2013.01); *H04B 17/309* (2015.01); *H04L 5/0023* (2013.01); *H04L 5/0048* (2013.01); *H04L 5/0051* (2013.01); *H04L 5/0057* (2013.01); *H04L 25/0226* (2013.01); *H04W 76/27* (2018.02); *H04L 5/0053* (2013.01); *H04L 5/0094* (2013.01)

(58) Field of Classification Search
CPC .. H04B 7/0417; H04B 7/0478; H04B 7/0482; H04B 7/0639; H04B 7/063; H04B 7/0632; H04B 7/0636; H04B 7/0643; H04L 25/0226; H04L 5/0023; H04L 5/0048; H04L 5/0051; H04L 5/0053; H04L 5/0057; H04L 5/0094; H04L 1/0026; H04W 24/10
See application file for complete search history.

(56) References Cited

U.S. PATENT DOCUMENTS

| | | | | |
|---|---|---|---|---|
| 9,198,071 | B2 * | 11/2015 | Geirhofer | H04W 24/10 |
| 9,225,478 | B2 * | 12/2015 | Chen | H04W 72/005 |
| 9,414,364 | B2 * | 8/2016 | Lee | H04W 72/0406 |
| 9,532,254 | B2 * | 12/2016 | Ko | H04W 24/10 |
| 9,602,183 | B2 * | 3/2017 | Kim | H04B 7/024 |
| 9,686,066 | B2 * | 6/2017 | Li | H04L 1/0027 |
| 9,801,167 | B2 | 10/2017 | Moulsley et al. | |
| 9,871,639 | B2 | 1/2018 | Lee et al. | |
| 9,900,074 | B2 * | 2/2018 | Mallik | H04B 7/0643 |
| 9,986,444 | B2 * | 5/2018 | Kim | H04B 7/0626 |
| 9,999,073 | B2 * | 6/2018 | Nammi | H04B 7/0452 |
| 10,009,158 | B2 * | 6/2018 | Guo | H04B 7/0626 |
| 10,014,911 | B2 * | 7/2018 | Marinier | H04B 7/0626 |
| 10,111,112 | B2 * | 10/2018 | Yang | H04W 72/1226 |
| 10,230,441 | B2 | 3/2019 | Kwak et al. | |
| 10,361,827 | B2 * | 7/2019 | Sayana | H04W 72/0413 |
| 10,411,868 | B2 * | 9/2019 | Onggosanusi | H04B 7/0478 |
| 10,447,368 | B2 * | 10/2019 | Gao | H04B 7/0452 |
| 10,567,061 | B2 * | 2/2020 | Liu | H04B 7/0417 |
| 10,630,364 | B2 * | 4/2020 | Wei | H04B 7/0626 |
| 10,855,434 | B2 * | 12/2020 | Papasakellariou | H04L 5/001 |
| 2009/0086842 | A1 | 4/2009 | Shi et al. | |
| 2011/0243207 | A1 | 10/2011 | Tang et al. | |
| 2012/0039298 | A1 | 2/2012 | Lee et al. | |
| 2012/0295650 | A1 | 11/2012 | Futaki et al. | |
| 2013/0242778 | A1 | 9/2013 | Geirhofer et al. | |
| 2013/0258964 | A1 | 10/2013 | Nam et al. | |
| 2013/0301448 | A1 | 11/2013 | Sayana et al. | |
| 2013/0336214 | A1 | 12/2013 | Sayana et al. | |
| 2014/0204871 | A1 | 7/2014 | Ode | |
| 2014/0247749 | A1 | 9/2014 | Kim et al. | |
| 2014/0341064 | A1 | 11/2014 | Prasad et al. | |
| 2015/0049625 | A1 | 2/2015 | Kim et al. | |
| 2015/0162966 | A1 | 6/2015 | Kim et al. | |
| 2015/0215093 | A1 | 7/2015 | Kim et al. | |
| 2015/0295694 | A1 | 10/2015 | Li et al. | |
| 2016/0013906 | A1 | 1/2016 | Guo et al. | |
| 2016/0014758 | A1 | 1/2016 | Lee et al. | |
| 2016/0050004 | A1 | 2/2016 | Mallik et al. | |
| 2016/0211902 | A1 | 7/2016 | Park et al. | |
| 2016/0212643 | A1 | 7/2016 | Park et al. | |
| 2016/0294454 | A1 | 10/2016 | Onggosanusi et al. | |
| 2016/0359538 | A1 | 12/2016 | Onggosanusi et al. | |
| 2017/0238323 | A1 | 8/2017 | Marinier et al. | |
| 2018/0091273 | A1 | 3/2018 | Choi et al. | |
| 2018/0212660 | A1 | 7/2018 | Gao et al. | |
| 2018/0262938 | A1 | 9/2018 | Liu et al. | |
| 2018/0278313 | A1 | 9/2018 | Kim et al. | |

FOREIGN PATENT DOCUMENTS

| | | |
|---|---|---|
| WO | 2014181551 A1 | 11/2014 |
| WO | 2015115706 A1 | 8/2015 |

OTHER PUBLICATIONS

Author Unknown, "Technical Specification Group Radio Access Network; Evolved Universal Terrestrial Radio Access (E-UTRA); Multiplexing and channel coding (Release 13)," Technical Specification 36.212, Version 13.0.0, 3GPP Organizational Partners, Dec. 2015, 121 pages.

Author Unknown, "Technical Specification Group Radio Access Network; Evolved Universal Terrestrial Radio Access (E-UTRA); Physical layer procedures (Release 13)," Technical Specification 36.213, Version 13.0.1, 3GPP Organizational Partners, Jan. 2016, 326 pages.

Author Unknown, "Technical Specification Group Radio Access Network; Evolved Universal Terrestrial Radio Access (E-UTRA); Radio Resource Control (RRC); Protocol specification (Release 13)," Technical Specification 36.331, Version 13.0.0, 3GPP Organizational Partners, Dec. 2015, 507 pages.

Qualcomm Incorporated, "R1-163043: Views on CSI enhancements for MU-MIMO," 3rd Generation Partnership Project (3GPP), TSG-RAN WG1 #84bis, Apr. 11-15, 2016, 4 pages, Busan, Korea.

Samsung, "R1-154154: Discussion on CSI reporting for LAA," 3GPP TSG RAN WG1 Meeting #82, Aug. 24-28, 2015, Beijing, China, 4 pages.

Non-Final Office Action for U.S. Appl. No. 15/543,766, dated Oct. 19, 2018, 12 pages.

Notice of Allowance for U.S. Appl. No. 15/543,766, dated Jun. 12, 2019, 8 pages.

Search Report for Japanese Patent Application No. 2018-559690, dated Oct. 9, 2019, 28 pages.

Notice of Reasons for Rejection for Japanese Patent Application No. 2018-559690, dated Oct. 15, 2019, 8 pages.

International Search Report and Written Opinion for International Patent Application No. PCT/SE2017/050501, dated Aug. 1, 2017, 17 pages.

First Office Action for Chinese Patent Application No. 201780028804.4, dated Nov. 12, 2020, 18 pages.

Notice of Reasons for Rejection for Japanese Patent Application No. 2018-559690, dated Feb. 12, 2020, 8 pages.

Second Office Action for Chinese Patent Application No. 201780028804.4, dated Apr. 29, 2021, 10 pages.

* cited by examiner

MULTI-RESOLUTION CSI FEEDBACK

This application is a continuation of U.S. application Ser. No. 15/543,766, filed Jul. 14, 2017, now U.S. Pat. No. 10,447,368, which is a 35 U.S.C. § 371 national phase filing of International Application No. PCT/SE2017/050501, filed May 15, 2017, which claims the benefit of U.S. Provisional Application No. 62/335,774, filed May 13, 2016, the disclosures of which are incorporated herein by reference in their entireties.

TECHNICAL FIELD

The present disclosure relates to methods and devices for Channel State Information (CSI) feedback in a communication system.

BACKGROUND

The Third Generation Partnership Project (3GPP) communication standards of Long Term Evolution (LTE) use Orthogonal Frequency-Division Multiplexing (OFDM) in the downlink (DL) and Discrete Fourier Transform (DFT) spread OFDM (DFTS-OFDM) in the uplink (UL). The basic LTE downlink physical resource can thus be seen as a time-frequency grid as shown in FIG. 1, where each resource element (RE) corresponds to one OFDM subcarrier (subcarrier spacing $\Delta f=15$ kHz) during one OFDM symbol interval (including cyclic prefix).

The next generation mobile wireless communication system (5G or New Radio [NR]), which is currently under standardization in 3GPP, will also use OFDM in DL and both OFDM and DFTS-OFDM in the UL. In addition to sub-carrier spacing $\Delta f=15$ kHz, more subcarrier spacing options will be supported in NR, i.e. $\Delta f=(15 \times 2^\alpha)$ kHz, where a is a non-negative integer.

In the time domain, LTE downlink transmissions are organized into radio frames of 10 ms, each radio frame consisting of ten equally-sized subframes (numbered 0-9) of length $T_{subframe}=1$ ms, as illustrated in FIG. 2. Each subframe is further divided into 2 slots each with OFDM symbols in a normal cyclic prefix configuration. A similar frame structure will also be used in NR, in which the subframe length is fixed at 1 ms regardless of the sub-carrier spacing used. The number of slots per subframe depends on the subcarrier spacing configured. The slot duration for $(15 \times 2^\alpha)$ kHz subcarrier spacing is given by $2^{-\alpha}$ ms assuming 14 OFDM symbols per slot.

Furthermore, the resource allocation in LTE is typically described in terms of resource blocks (RB) or physical resource blocks (PRB), where a PRB corresponds to one time slot (0.5 ms) of seven symbols (numbered 0-6) in the time domain and 12 contiguous subcarriers in the frequency domain, whereby one PRB consists of 7 by 12 RE. Resource blocks are numbered in the frequency domain, starting with 0 from one end of the system bandwidth. The minimum resource unit for scheduling is a PRB pair, i.e. two PRBs over two slots in a subframe. For convenience, PRB is used also to refer to a PRB pair in the rest of the text. In NR, a PRB also includes 12 subcarriers in frequency but may span one or more slots in the time domain. The minimum resource unit for scheduling in NR can be one slot, to achieve reduced latency and increased flexibility. To simplify the discussion, subframe is used when scheduling is discussed. It should, however, be understood that it is also applicable to slot in NR.

Downlink transmissions are dynamically scheduled, i.e., in each subframe the base station transmits control information about to which terminals data is transmitted and upon which resource blocks the data is transmitted, in the current downlink subframe. This control signaling is typically transmitted in the first 1, 2, 3 or 4 OFDM symbols in each subframe in LTE. A downlink system with OFDM symbols as control is illustrated in FIG. 3. In NR, the exact control signaling is still under discussion, but it is likely that the control signal will also be transmitted in the first OFDM symbols.

Physical Channels and Transmission Modes

In LTE, a number of physical DL channels are supported. A downlink physical channel corresponds to a set of resource elements carrying information originating from higher layers. The following are some of the physical channels supported in LTE:

Physical Downlink Shared Channel, PDSCH
Physical Downlink Control Channel, PDCCH
Enhanced Physical Downlink Control Channel, EPDCCH PDSCH is used mainly for carrying user traffic data and higher layer messages. PDSCH is transmitted in a DL subframe outside of the control region as shown in FIG. 3. Both PDCCH and EPDCCH are used to carry Downlink Control Information (DCI) such as PRB allocation, modulation level and coding scheme (MCS), precoder used at the transmitter, etc. PDCCH is transmitted in the first one to four OFDM symbols in a DL subframe, i.e. the control region, while EPDCCH is transmitted in the same region as PDSCH. PDCCH and PDSCH will also be supported in NR.

Similarly, the following physical UL channels are supported in both LTE and NR:

Physical Uplink Shared Channel, PUSCH
Physical Uplink Control Channel, PUCCH

Different DCI formats are defined in LTE for DL and UL data scheduling. For example, DCI formats 0 and 4 are used for UL data scheduling while DCI formats 1, 1A, 1B, 1C, 1D, 2, 2A, 2B, 2C, 2D are used for DL data scheduling. In DL, which DCI format is used for data scheduling is associated with a DL transmission scheme and/or the type of message to be transmitted. The following are some of the transmission schemes supported in LTE:

Single-antenna port
Transmit diversity (TxD)
Open-loop spatial multiplexing
Close-loop spatial multiplexing
Up to 8 layer transmission PDCCH is always transmitted with either the single-antenna port or Transmit Diversity scheme while PDSCH can use any one of the transmission schemes. In LTE, a UE is configured with a transmission mode (TM), rather than a transmission scheme. There are 10 TMs, i.e. TM1 to TM10, defined so far for PDSCH in LTE. Each TM defines a primary transmission scheme and a backup transmission scheme. The backup transmission scheme is either single antenna port or TxD. Following is a list of some primary transmission schemes in LTE:

TM1: single antenna port, port 0
TM2: TxD
TM3: open-loop SM
TM4: close-loop SM
TM9: up to 8 layer transmission, port 7-14
TM10: up to 8 layer transmission, port 7-14

It is noted that in this respect, TM9 and TM 10 are identical, but they differ in other respects. In TM1 to TM6, cell specific reference signal (CRS) is used as the reference signal for both channel state information feedback and for demodulation at a User Equipment (UE), while in TM7 to TM10, UE specific demodulation reference signal (DMRS) is used as the reference signal for demodulation.

Codebook-Based Precoding

Multi-antenna techniques can significantly increase the data rates and reliability of a wireless communication system. The performance is in particular improved if both the transmitter and the receiver are equipped with multiple antennas, which results in a multiple-input multiple-output (MIMO) communication channel. Such systems and/or related techniques are commonly referred to as MIMO.

The LTE standard is currently evolving with enhanced MIMO support. A core component in LTE is the support of MIMO antenna deployments and MIMO related techniques. Currently LTE Advanced supports up to 8-layer spatial multiplexing with up to 32 or 16 transmitter (Tx) antennas with channel dependent precoding. The spatial multiplexing mode is aimed for high data rates in favorable channel conditions. An illustration of the transmission structure of precoded spatial multiplexing mode in LTE is provided in FIG. 4.

As seen in FIG. 4, the information carrying symbol vector s is multiplied by an $N_T \times r$ precoder matrix W, which serves to distribute the transmit energy in a subspace of the $N_T$ (corresponding to $N_T$ antenna ports) dimensional vector space. The precoder matrix is typically selected from a codebook of possible precoder matrices, and typically indicated by means of a precoder matrix indicator (PMI), which specifies a unique precoder matrix in the codebook for a given number of symbol streams. The r symbols in s each correspond to a layer and r is referred to as the transmission rank. In this way, spatial multiplexing is achieved since multiple symbols can be transmitted simultaneously over the same time/frequency resource element (TFRE) or RE. The number of symbols r is typically adapted to suit the current channel properties.

LTE uses OFDM in the downlink (and DFT precoded OFDM in the uplink) and hence the received $N_R \times 1$ (where $N_R$ is the number of receive antenna ports at a UE) vector $y_n$ for a certain TFRE on subcarrier n (or alternatively data TFRE number n) is thus modeled by $$y_n = H_n W s_n + e_n \quad (1)$$

where $e_n$ is a noise/interference vector obtained as realizations of a random process. The precoder W can be a wideband precoder, which is constant over frequency, or frequency selective.

The precoder matrix is often chosen to match the characteristics of the $N_R \times N_T$ MIMO channel matrix $H_n$, resulting in so-called channel dependent precoding. This is also commonly referred to as closed-loop precoding and essentially strives for focusing the transmit energy into a subspace which is strong in the sense of conveying much of the transmitted energy to the UE. In addition, the precoder matrix may also be selected to strive for orthogonalizing the channel, meaning that after proper linear equalization at the UE, the inter-layer interference is reduced.

The transmission rank, and thus the number of spatially multiplexed layers, is reflected in the number of columns of the precoder. For efficient performance, it is important that a transmission rank that matches the channel properties is selected.

SU-MIMO and MU-MIMO

When all the data layers are transmitted to one UE, it is referred to as single user MIMO or SU-MIMO. On the other hand, when the data layers are transmitted to multiple UEs, it is referred to as multi-user MIMO or MU-MIMO. MU-MIMO is possible when, for example, two UEs are located in different areas of a cell such that they can be separated through different precoders (or beamforming) at the Base Transceiver Station (BTS), the two UEs may be served on the same time-frequency resources (i.e. PRBs) by using different precoders or beams. In DMRS based transmission modes TM9 and TM10, different DMRS ports and/or the same DMRS port with different scrambling codes can be assigned to the different UEs for MU-MIMO transmission. In this case, MU-MIMO is transparent to UE, i.e., a UE is not informed about the co-scheduling of another UE in the same PRBs.

MU-MIMO requires more accurate downlink channel information than in SU-MIMO in order for the eNB to use precoding to separated the UEs, i.e. reducing cross interference to the co-scheduled UEs.

Channel State Information Reference Signal (CSI-RS)

In LTE Release 10 (Rel-10), a new channel state information reference signal (CSI-RS) was introduced for the intent to estimate channel state information. The CSI-RS based CSI feedback provides several advantages over the CRS based CSI feedback used in previous releases. Firstly, the CSI-RS is not used for demodulation of the data signal, and thus does not require the same density (i.e., the overhead of the CSI-RS is substantially less). Secondly, CSI-RS provides a much more flexible means to configure CSI feedback measurements (e.g., which CSI-RS resource to measure on can be configured in a UE specific manner).

Two types of CSI-RS are defined in LTE: non-zero power (NZP) and zero power (ZP) CSI-RS. NZP CSI-RS can be used to estimate the effective channel of a serving transmission point (TP), while ZP CSI-RS can be used to measure interference, or to prevent interference to other UEs receiving signals in the ZP CSI-RS resource elements. For simplicity, NZP CSI-RS may occasionally be referred to as CSI-RS in this disclosure.

By measuring on a CSI-RS, a UE can estimate the effective channel the CSI-RS is traversing, including the radio propagation channel and antenna gains. In more mathematical rigor this implies that if a known CSI-RS signal x is transmitted, a UE can estimate the coupling between the transmitted signal and the received signal (i.e., the effective channel). Hence if no virtualization is performed in the transmission, the received signal y can be expressed as $$y = Hx + e \quad (2)$$

and the UE can estimate the effective channel H.

Up to eight CSI-RS ports can be configured for a Rel-11 UE, that is, the UE can thus estimate the channel from up to eight transmit antennas. In Rel-13, up to 16 CSI-RS ports are supported.

FIG. 5 shows the REs available for CSI-RS allocations in a PRB. Up to 40 REs can be configured for CSI-RS. CSI-RS is transmitted over all PRBs of the downlink system bandwidth in order for a UE to measure CSI over the whole bandwidth.

CSI-RS can be transmitted periodically on certain subframes, also referred as CSI-RS subframes. A CSI-RS subframe configuration consists of a subframe periodicity and a subframe offset. The periodicity is configurable at 5, 10, 20, 40 and 80 ms.

A CSI-RS configuration consists of a CSI-RS resource configuration and a CSI-RS subframe configuration.

Codebook Based Channel State Information (CSI) Estimation and Feedback

In closed loop MIMO transmission schemes such as TM9 and TM10, a UE estimates and feeds back the downlink CSI to the evolved Node B (eNB). The eNB uses the feedback CSI to transmit downlink data to the UE. The CSI consists of a transmission rank indicator (RI), a precoding matrix indicator (PMI) and a channel quality indicator(s) (CQI). A codebook of precoding matrices for each rank is used by the UE to find out the best match between the estimated downlink channel $H_n$ and a precoding matrix in the codebook based on certain criteria, for example, the UE throughput. The channel $H_n$ is estimated based on a NZP CSI-RS transmitted in the downlink for TM9 and TM10.

The CQI/RI/PMI together provide the downlink channel state of a UE. This is also referred to as implicit CSI feedback since the estimation of $H_n$ is not fed back directly. The CQI/RI/PMI can be wideband or sub-band depending on which reporting mode is configured.

The RI corresponds to a recommended number of data symbols/streams that are to be spatially multiplexed and thus transmitted in parallel over the downlink channel. The PMI identifies a recommended precoding matrix codeword (in a codebook which contains precoders with the same number of rows as the number of CSI-RS ports) for the transmission, which relates to the spatial characteristics of the channel. The CQI represents a recommended transport block size (i.e., code rate) and LTE supports transmission of one or two simultaneous (on different layers) transmissions of transport blocks (i.e. separately encoded blocks of information) to a UE in a subframe. There is thus a relation between a CQI and an Signal-to-Interference-plus-Noise Ratio (SINR) of the spatial stream(s) over which the transport block or blocks are transmitted.

A codebook of up to 32 (previously 16) antenna ports has been defined in LTE. Both one-dimensional (1D) and two-dimensional (2D) antenna array are supported. For LTE Rel-12 UE and earlier, only a codebook feedback for a 1D port layout is supported, with 2, 4 or 8 antenna ports. Hence, the codebook is designed assuming these ports are arranged on a straight line. In LTE Rel-13, codebooks for 2D port layouts were specified for the case of 8, 12 or 16 antenna ports. In addition, a codebook 1D port layout for the case of 16 antenna ports was also specified in LTE Rel-13.

In LTE Rel-13, two types of CSI reporting were introduced, i.e. Class A and Class B. In Class A CSI reporting, a UE measures and reports CSI based on a codebook for the configured 2D antenna array with 8, 12 or 16 antenna ports. The Class A codebook is defined by five parameters, i.e. (N1, N2, O1, O2, Config), where (N1, N2) are the number of antenna ports in a first and a second dimension, respectively and (O1,O2) are the DFT oversampling factors for the first and the second dimension, respectively. Config ranges from 1 to 4 and defines four different ways the codebook is formed. For Config=1, a PMI corresponding to a single 2D beam is fed back for the whole system bandwidth while for Config $\in\{2,3,4\}$, PMIs corresponding to four 2D beams are fed back and each subband may be associated with a different 2D beam. The CSI consists of a RI, a PMI and a CQI or CQIs, similar to the CSI reporting in pre Rel-13.

In Class B CSI reporting, in one scenario (also referred to as "K>1"), the eNB may pre-form multiple beams in one antenna dimension. There can be multiple ports (1, 2, 4 or 8 ports) within each beam on the other antenna dimension. "Beamformed" CSI-RS are transmitted along each beam. A UE first selects the best beam from a group of beams configured and then measures CSI within the selected beam based on the legacy codebook for 2, 4 or 8 ports. The UE then reports back the selected beam index and the CSI corresponding to the selected beam. In another scenario (also referred to as "K=1"), the eNB may form up to 4 (2D) beams on each polarization and "beamformed" CSI-RS is transmitted along each beam. A UE measures CSI on the "beamformed" CSI-RS and feedback CSI based on a new Class B codebook for 2, 4, 8 ports.

In LTE Rel-14, Class-A codebooks for additional one- and two-dimensional port layouts with 8, 12, 16, 20, 24, 28 and 32 antenna ports were specified. In addition, an advanced Class-A codebook was introduced with higher resolution channel feedback to support MU-MIMO operations. However, a UE can only be configured semi-statically with either the regular Class-A codebook based feedback or the advanced codebook-based CSI feedback.

CSI Process

In LTE Release 11, CSI processes are defined such that each CSI process is associated with a CSI-RS resource and a CSI-IM resource. A CSI-IM resource is defined by a ZP CSI-RS resource and a ZP CSI-RS subframe configuration. A UE in transmission mode 10 can be configured with one or more (up to four) CSI processes per serving cell by higher layers and each CSI reported by the UE corresponds to a CSI process. The multiple CSI processes were introduced to support Coordinated Multi-Point (COMP) transmission in which a UE measures and feeds back CSI associated with each transmission point to an eNB. Based on the received CSIs, the eNB may decide to transmit data to the UE from one of the TPs.

CSI Reporting

For CSI reporting, both periodic and aperiodic (i.e. triggered by eNB) reports are supported, known as P-CSI and A-CSI respectively. In a CSI process, a set of CSI-RS ports are configured for which the UE performs measurements. These CSI-RS ports can be configured to be periodically transmitted with 5 ms, 10 ms, 20 ms etc. periodicity. The periodic report may use PUCCH format 2, or its variants (2a, 2b) and has a configured periodicity as well, e.g. 20 ms. RI, PMI, CQI may be reported on different subframes in some case due to the payload size limitation of PUCCH format 2.

In case of aperiodic CSI reporting, a UE reports CSI only when it is requested by the eNB. A CSI reporting request is carried in an uplink DCI (i.e. DCI 0 or DCI 4) and the corresponding report is carried in a PUSCH configured by the DCI. PUSCH is generally able to carry a much larger payload than PUCCH and thus CSI can be sent in one subframe.

For a given CSI process configured for a UE, both periodic and aperiodic CSI reporting can be configured. Periodic CSI can be used for the UE to report CSI periodically even there is no data to send to the UE. This can be used to obtain long term CSI at the eNB. On the other hand, aperiodic CSI can be used only when there is data to transmit to the UE, it can provide more instantaneous CSI to track fast channel variations and thus better channel utilization.

Different feedback reporting modes may be used for periodic and aperiodic CSI reporting. For example, wideband PMI and CQI report could be configured for periodic CSI reporting while subband PMI and CQI report could be configured for aperiodic CSI reporting. However, for the same CSI process, the same codebook is used for both.

In some scenarios, the CSI feedback may be restricted to a subset of the codewords in a codebook by means of codebook set restriction configuration. In this case, a UE measures CSI based on the configured subset of codeword in the codebook. In some other cases, subsampling of the codebook can be used to reduce the periodic CSI feedback overhead.

When multiple CSI processes or multiple downlink carriers (or cells) are configured for a UE, CSI reporting configuration can be different for different cells or different CSI processes. However, for a NZP CSI-RS configuration in a CSI process, only one codebook per rank can be configured for CSI measurement and reporting; different codebooks for the same CSI-RS configuration is not supported in LTE.

SUMMARY

It has now been realized that a problem with the current standards, as discussed above, is that for a given CSI-RS resource configuration, a single codebook per rank is used for both periodic and aperiodic CSI feedback in the existing CSI feedback in LTE. This means that the same channel resolution or accuracy is reported. In a real network, the channel information needed by an eNB is different for SU-MIMO and MU-MIMO. More accurate channel information is needed for MU-MIMO than for SU-MIMO. However, feeding back more accurate CSI would require more feedback overhead in the uplink. Whether a UE can participate in MU-MIMO transmission depends on the availability of other UE candidates in the network, which can change over time. Thus when there are no UE candidates available for MU-MIMO, low overhead CSI feedback based on regular codebook is adequate for SU-MIMO transmission. On the other hand, when there are UE candidates available for MU-MIMO transmission, CSI feedback based on advanced codebook should be used to support MU-MIMO transmission. Therefore, it is desirable to be able to switch CSI feedback types dynamically. The existing CSI feedback does thus not fulfill the CSI feedback requirements for both SU-MIMO and MU-MIMO transmission while maintaining a low feedback overhead.

According to an aspect of the present disclosure, there is provided a method performed by a radio device for CSI feedback in a communication system comprising a RAN node. The method comprises receiving, from the RAN node, information about a CSI-RS resource, a first CSI type and a second CSI type for feedback. The method also comprises receiving, from the RAN node, a CSI feedback request for CSI measurement and feedback of the first CSI type or the second CSI type. The method also comprises measuring CSI of the indicated type based on signals received on the CSI-RS resource. The method also comprises sending, to the RAN node, a CSI report of the requested CSI type.

According to another aspect of the present disclosure, there is provided a method performed by a RAN node for CSI feedback in a communication system comprising the RAN node equipped with multiple transmit antenna ports for transmitting data to a radio device. The method comprises sending, to the radio device, information about a CSI-RS resource, a first CSI type and a second CSI type for feedback. The method also comprises sending, to the radio device, a CSI feedback request for CSI measurement and feedback of the first CSI type or the second CSI type. The method also comprises transmitting at least one CSI-RS signal in the CSI-RS resource, and receiving, from the radio device, a CSI report of the requested CSI type.

According to another aspect of the present disclosure, there is provided a method of CSI feedback in a communication system comprising a RAN node provided with multiple transmit antenna ports for transmitting data to a radio device. The method comprises sending, by the RAN node to the radio device, information about a CSI-RS resource, a first CSI type and a second CSI type for feedback. The method also comprises sending, by the RAN node to the radio device, a CSI feedback request for CSI measurement and feedback of the first CSI type or the second CSI type. The method also comprises measuring, by the radio device, CSI of the indicated type based on signals received in the CSI-RS resource. The method also comprises receiving, by the RAN node from the radio device, a CSI report of the requested CSI type.

According to another aspect of the present disclosure, there is provided a computer program product comprising computer-executable components for causing a device, such as an embodiment of the system, radio device or RAN node of the present disclosure, to realize an method embodiment within the present disclosure when the computer-executable components are run on processor circuitry comprised in the device.

According to another aspect of the present disclosure, there is provided a radio device for CSI feedback in a communication system comprising a RAN node. The radio device comprises processor circuitry and storage storing instructions executable by said processor circuitry, whereby said radio device is operative to receive, from the RAN node, information about a CSI-RS resource, a first CSI type and a second CSI type for feedback. The radio device is also operative to receive, from the RAN node, a CSI feedback request for CSI measurement and feedback of the first CSI type or the second CSI type. The radio device is also operative to measure CSI of the indicated type based on signals received on the CSI-RS resource. The radio device is also operative to send, to the RAN node, a CSI report of the requested CSI type.

According to another aspect of the present disclosure, there is provided a RAN node for CSI feedback in a communication system comprising the RAN node equipped with multiple transmit antenna ports for transmitting data to a radio device. The RAN node comprises processor circuitry, and storage storing instructions executable by said processor circuitry whereby said RAN node is operative to send, to the radio device, information about a CSI-RS resource, a first CSI type and a second CSI type for feedback. The RAN node is also operative to send to the radio device, a CSI feedback request for CSI measurement and feedback of the first CSI type or the second CSI type. The RAN node is also operative to transmit at least one CSI-RS signal in the CSI-RS resource. The RAN node is also operative to receive, from the radio device, a CSI report of the requested CSI type.

According to another aspect of the present disclosure, there is provided a communication system comprising processor circuitry, and storage storing instructions executable by said processor circuitry whereby said system is operative to send, by a RAN node comprised in the communication system to a radio device comprised in the communication system, information about a CSI-RS resource, a first CSI type and a second CSI type for feedback. The system is also operative to send, by the RAN node to the radio device, a CSI feedback request for CSI measurement and feedback of the first CSI type or the second CSI type. The system is also operative to measure, by the radio device, CSI of the indicated type based on signals received in the CSI-RS resource. The system is also operative to receive, by the RAN node from the radio device, a CSI report of the requested CSI type.

According to another aspect of the present disclosure, there is provided a computer program for CSI feedback in a communication system comprising a RAN node equipped with multiple transmit antenna ports for transmitting data to a radio device. The computer program comprises computer program code which is able to, when run on processor circuitry of the radio device, cause the radio device to receive, from the RAN node, information about a CSI-RS resource, a first CSI type and a second CSI type for feedback. The code is also able to cause the radio device to receive, from the RAN node, a CSI feedback request for CSI measurement and feedback of the first CSI type or the second CSI type. The code is also able to cause the radio device to measure CSI of the indicated type based on signals received in the CSI-RS resource. The code is also able to cause the radio device to send, to the RAN node, a CSI report of the requested CSI type.

According to another aspect of the present disclosure, there is provided a computer program for CSI feedback in a communication system comprising a RAN node equipped with multiple transmit antenna ports for transmitting data to a radio device. The computer program comprises computer program code which is able to, when run on processor circuitry of the RAN node, cause the RAN node to send, to the radio device, information about a CSI-RS resource, a first CSI type and a second CSI type for feedback. The code is also able to cause the RAN node to send, to the radio device, a CSI feedback request for CSI measurement and feedback of the first CSI type or the second CSI type. The code is also able to cause the RAN node to transmit at least one CSI-RS signal in the CSI-RS resource. The code is also able to cause the RAN node to receive, from the radio device, a CSI report of the requested CSI type.

In accordance with the present disclosure, a solution to the problem is proposed by means of methods to feedback CSI with different accuracies or resolutions, in which more than one codebook per rank may be configured for a configured CSI-RS resource in either a single or multiple CSI-RS process.

The codebooks associated with a CSI-RS resource may be semi-statically signaled to a UE through Radio Resource Control (RRC) signaling. The codebook used for CSI measurement and feedback may be dynamically indicated from an eNB to a UE. The dynamic indication may be carried over downlink control information through either a downlink or uplink grant.

The proposed solution provides a more efficient tradeoff between CSI accuracy and feedback overhead. For example, when the network load is low and there are not many UEs in the system for MU-MIMO transmission, CSI feedback with low accuracy or resolution could be used to save feedback overhead. On the other hand, when there are many active UEs present in the system and MU-MIMO transmission is beneficial, the CSI feedback with high accuracy or resolution may be used.

In addition, the high accuracy CSI feedback might only be requested from a UE when the UE is a candidate for MU-MIMO transmission.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, on which.

DETAILED DESCRIPTION

Embodiments will now be described more fully hereinafter with reference to the accompanying drawings, on which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Note that although terminology from 3GPP LTE has been used in this disclosure to exemplify embodiments, this should not be seen as limiting the scope of the disclosure to only the aforementioned system. Other wireless systems, including next-generation radio (NR or 5G), Wideband Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Also note that terminology such as eNodeB (eNB) and UE should be considering non-limiting and does in particular not imply a certain hierarchical relation between the two. In general "eNodeB" could be considered as a first device and "UE" a second device, and these two devices communicate with each other over some radio channel. Herein, we also focus on wireless transmissions in the downlink, but the disclosure may also be applicable in the uplink.

Figure 1:
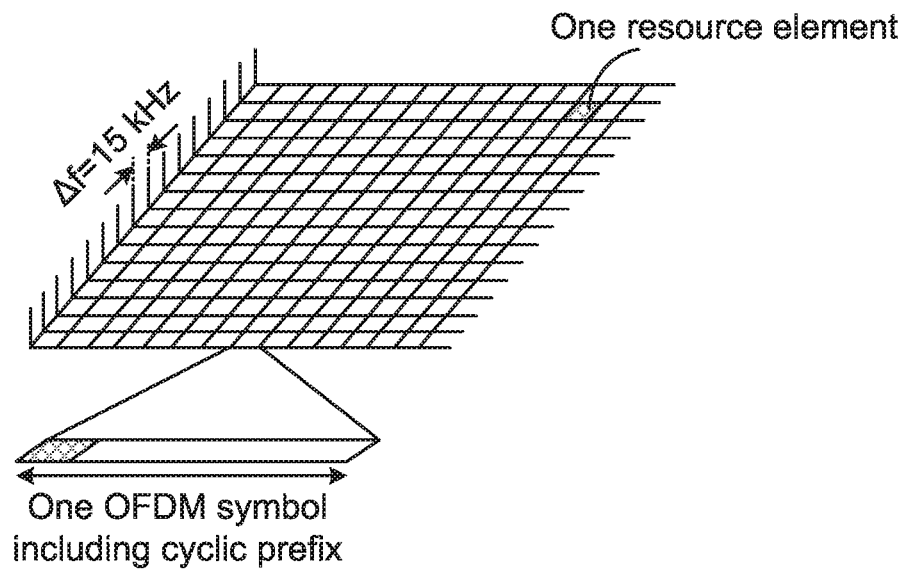
FIG. 1 is a schematic time-frequency grid of REs in LTE.
Figure 2:
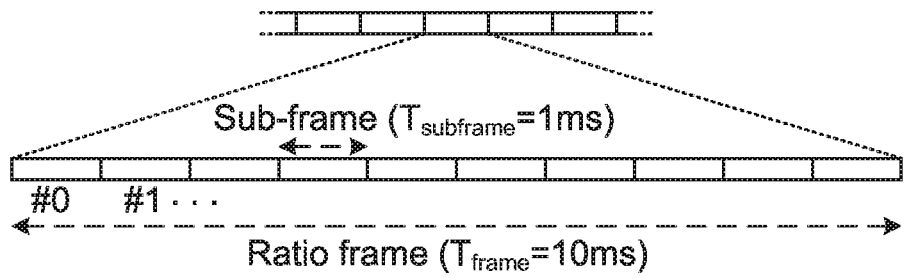
FIG. 2 is a schematic illustration of a radio frame in LTE.
Figure 3:
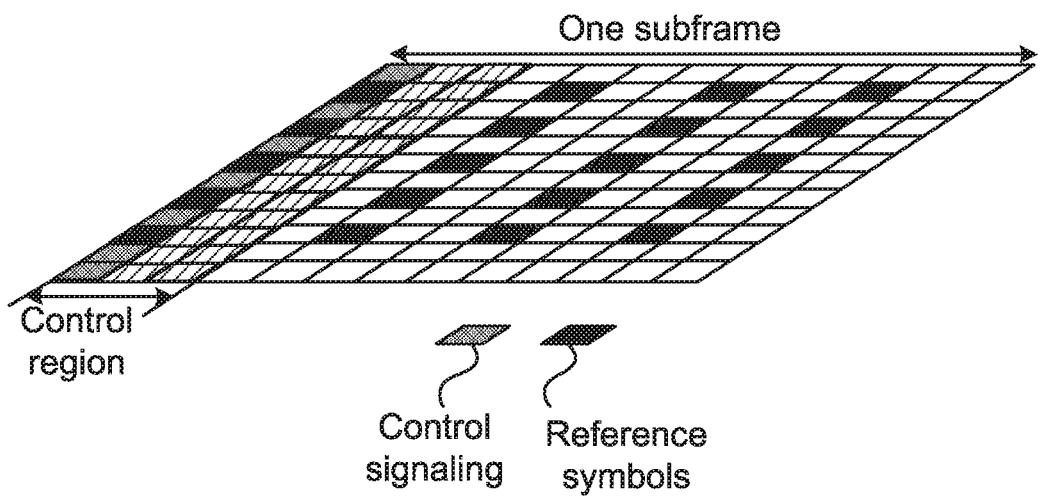
FIG. 3 is a schematic time-frequency grid of control signaling in LTE.
Figure 4:
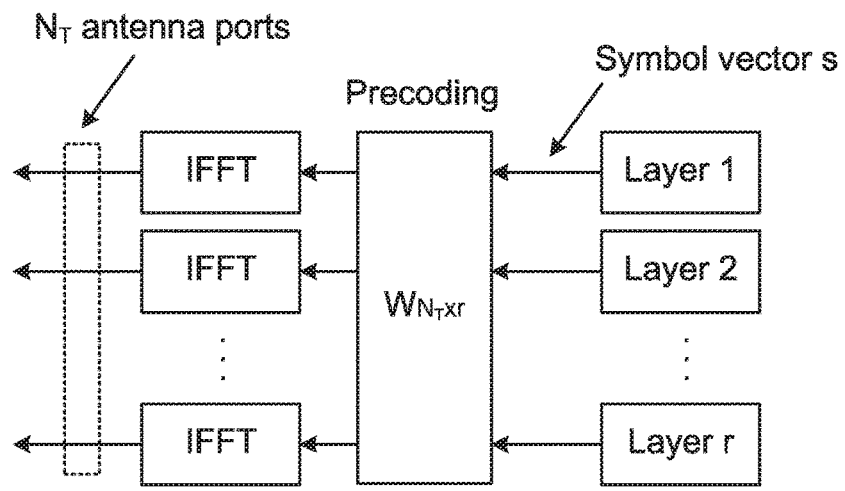
FIG. 4 is a schematic block diagram of precoding in LTE.
Figure 5:
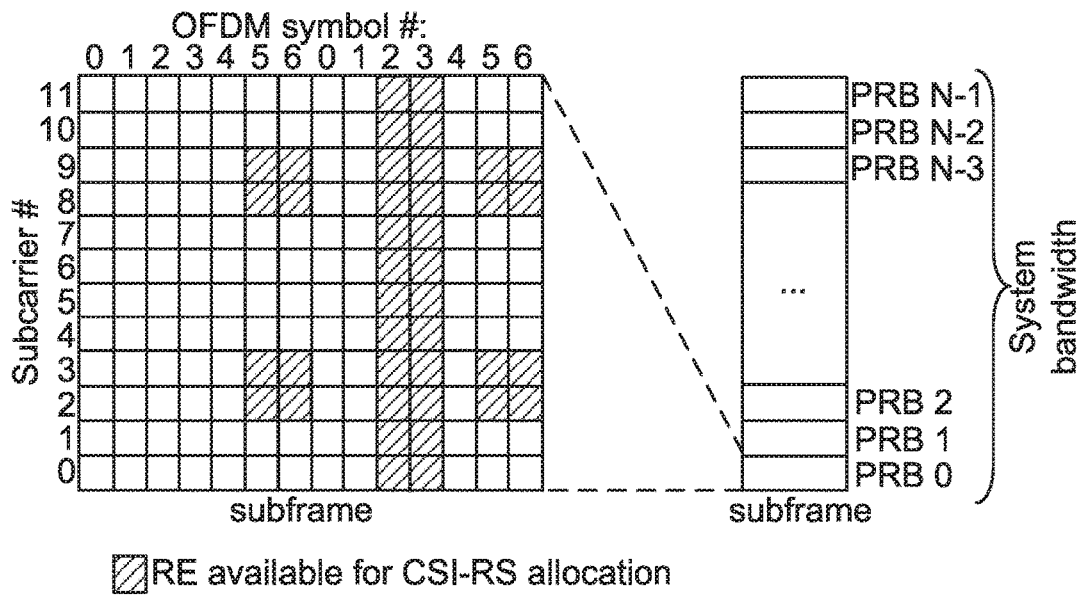
FIG. 5 is a schematic time-frequency grid of REs for CSI-RS allocation in LTE.
Figure 6:
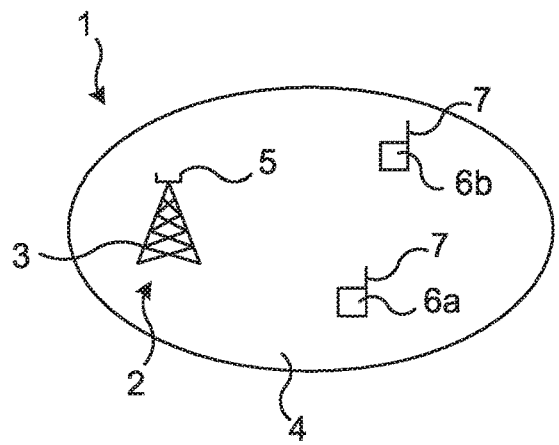
FIG. 6 is a schematic diagram of an embodiment of a communication system, in accordance with the present disclosure.

FIG. 6 is a schematic diagram of an embodiment of a communication system or network 1, in accordance with the present disclosure. The communication system 1 comprises a Radio Access Network (RAN) 2 comprising at least one RAN node 3, e.g. an eNB or other base station of a cellular communication network in accordance with a 3GPP communication standard. The RAN node 3 serves a cell 4 of the RAN 2 by means of one or a plurality of antennas or antenna elements 5, corresponding to antenna ports. Often, the RAN 2 of the communication system 1 comprises a plurality of RAN nodes/base stations 3, serving a plurality of cells, but the figure is simplified to only show one RAN node 3 and one cell 4. Radio devices 6, mobile or stationary, e.g. UEs or other wireless terminals, located within a geographical area covered by the cell 4 may connect to, and communicate with or via, the RAN node 3. Any number of radio devices 6 may be located in the cell area, but in the figure are shown a first radio device 6a and a second radio device 6b. Each radio device 6 comprises one or a plurality of antennas or antenna elements 7, corresponding to antenna ports.

Generally, a radio device 6, as discussed herein, may be any wireless device or user equipment (UE), mobile or stationary, enabled to communicate over a radio channel in the communication system or network 1, for instance but not limited to e.g. mobile phone, smartphone, modem, sensors, meters, vehicles (e.g. a car), household appliances, medical appliances, media players, cameras, or any type of consumer electronic, for instance but not limited to television, radio, lighting arrangements, tablet computer, laptop, or personal computer (PC).

In some embodiments of multi-resolution CSI reporting based on CSI-RS transmitted in semi-statically configured CSI-RS subframes, a UE 6 is configured to report two types CSIs for the same transmit antenna port layout (N1,N2) signaled to the UE, where N1 and N2 are the number of antenna ports in a first and a second dimension. For example, N1 can be the number of antenna ports in the horizontal direction and N2 can be the number of vertical antenna ports in the vertical direction. The configuration can be semi-statically signaled to the UE through RRC signaling by its connected eNB 3.

For CSI measurement, the UE 6 is signaled with one CSI-RS resource configuration and a set of CSI-RS subframes for CSI-RS transmission on the configured (N1,N2) antenna ports. The UE is also signaled with an interference measurement resource used for both of the two types CSI, all associated with a single CSI-RS process.

Figure 7:
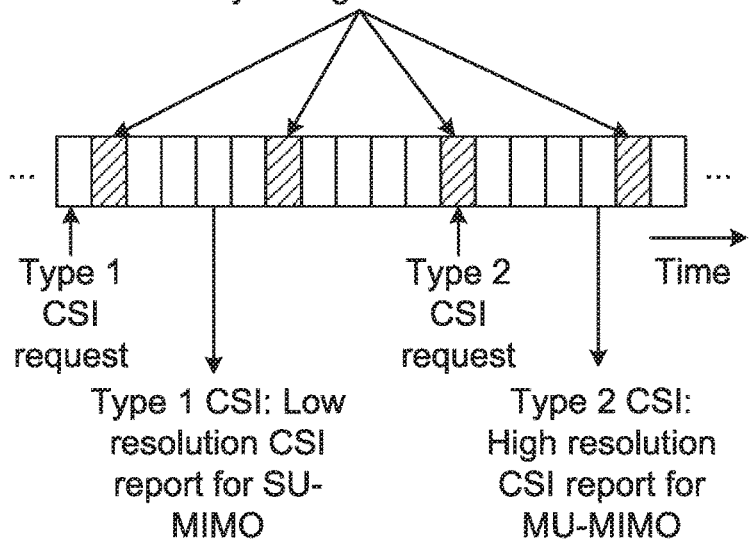
FIG. 7 is a schematic block diagram of an embodiment of a series of subframes for multi-resolution CSI feedback, in accordance with the present disclosure.

Alternatively, a UE 6 may be configured with two CSI-RS processes having the same CSI-RS resource. The first type of CSI is associated with one CSI-RS process and the second type of CSI is associated with the other CSI-RS process. This is illustrated in FIG. 7.

The first type of CSI may be a CSI of the "CLASS A" type defined in LTE release 13 for CSI reporting based on an existing "CLASS A" codebook. For example, the codebook may be configured by (N1, N2, O1, O2, Config_num), where O1 and O2 are the DFT beam oversampling factor and Config_num is one of the four configurations defined in LTE release 13. This type of CSI has generally low resolution and is mainly used for SU-MIMO transmission.

The second type of CSI may be a CSI with enhanced channel feedback, i.e. with high accuracy and/or high resolution. High accuracy or high resolution CSI means that the CSI can be used by the eNB to better reconstruct the underlying channel. Let H be the estimated $N_R \times N_T$ (corrponding to $N_R$ receive antenna ports and $N_T$ transmit antenna ports) channel matrix at a UE, and $H_1$, $H_2$ be the reconstructed channel matrices based on the first type of CSI and the second type of CSI feedback, respectively. We have $\|H-H_2\|^2 < \|H-H_1\|^2$, where $\|\cdot\|^2$ is a matrix norm. $\|H-H_i\|^2$ (i=1,2) represents the channel feedback error. In other words, the channel feedback error is much smaller with the second type of CSI feedback than with the first type of CSI feedback. Note that CSI accuracy or CSI resolution is defined here assuming that the minimum channel feedback error of a CSI calculation method or codebook is used. For example, a CSI reporting scheme that only uses part of a codebook to determine a CSI report is not considered to have a lower resolution than a CSI reporting scheme that uses the full codebook.

The second type of CSI feedback may be either implicit based on a new codebook or explicit in which no codebook is used. One example of explicit CSI feedback is to feedback a quantized version of the estimated channel matrix H or its principle eigen vectors and the associated eigen values. For example, let $h_{kl}=|h_{kl}|e^{j\varphi_{kl}}$ be the $(k,l)^{th}$ element of H, both the amplitude $|h_{kl}|$ and the phase $\varphi_{kl}$ each may be quantized with certain number of bits, e.g. 4 bits. Let's denote $|\hat{h}_{kl}|^{(q_h)}$ and $\hat{\varphi}_{kl}^{(q_\varphi)}$ as the quantized version of $|h_{kl}|$ and $\varphi_{kl}$, where each of $|\hat{h}_{kl}|^{(q_h)}$ and $\hat{\varphi}_{kl}^{(q_\varphi)}$ have $2^4=16$ distinct states associated with $q_h \in \{0,1,\ldots,15\}$ and $q_\varphi \in \{0,1,\ldots,15\}$, and the quantized version of $h_{kl}$ is then $\hat{h}_{kl}^{(q_h,\,q_\varphi)}=|\hat{h}_{kl}|^{(q_h)}\hat{\varphi}_{kl}^{(q_\varphi)}$. The quantized version of H becomes $\hat{H}$ with $\hat{h}_{kl}^{(q_h,q_\varphi)}$ as its $(k,l)^{th}$ element. $\hat{H}$ can then be identified in CSI feedback with the set of values of $q_h$ and $q_\varphi$ corresponding to each $\hat{h}_{kl}^{(q_h,q_\varphi)}$. Alternatively, singular-value decomposition (SVD) of H may be performed as $$H = \sum_i \sqrt{\lambda_i} u_i v_i^H$$

and only a few dominant eigen values $\{\lambda_i\}$ and the corresponding eigen vectors $\{v_i\}$ may be quantized and fed back. There can be other ways to feedback H explicitly without a codebook.

The secondary type of CSI may typically be used for high resolution CSI feedback targeting MU-MIMO transmissions.

The second type of CSI may be reported by a UE 6 only when it is requested, i.e. aperiodically. The request may be dynamic and only signaled when the UE may be paired with another UE in a cell 4 for MU-MIMO transmission.

The first type of CSI may be reported periodically and may also be reported aperiodically by a UE 6. The dynamic request may also include an indicator to indicate which type of CSI should be reported.

Figure 8:
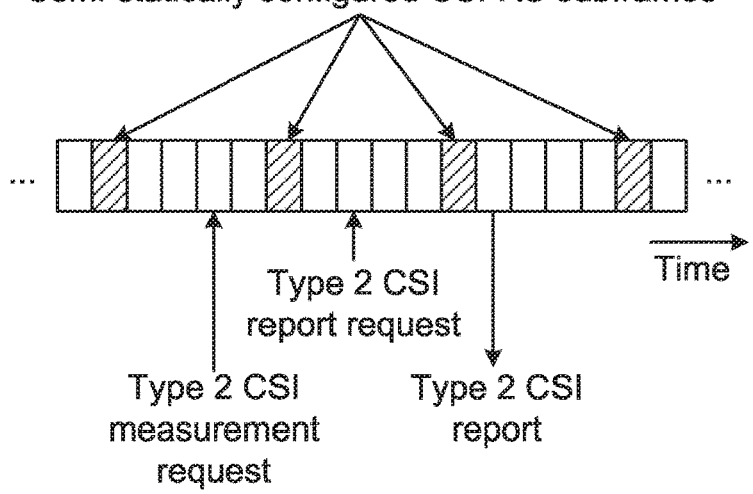
FIG. 8 is a schematic block diagram of an embodiment of a series of subframes for triggering high-resolution CSI feedback, in accordance with the present disclosure.

In one embodiment, the aperiodic CSI feedback request may comprise or consist of a CSI measurement request and a CSI report request to provide the UE with more processing time between a CSI measurement and a CSI report. An example of triggering high resolution CSI feedback with two requests is shown in FIG. 8. The CSI measurement request is sent first in a subframe for a UE to measure CSI followed by a CSI report request in a later subframe for the UE to report the measured CSI. The CSI measurement request is sent before or in a CSI-RS subframe and the CSI report request needs to be sent after the CSI-RS subframe. This provides more processing time (e.g. >4 subframes) for a UE to measure and report CSI.

The CSI measurement request may include a CSI type indicator to indicate which CSI type is to be measured and reported. The CSI report may also include uplink PUSCH resources to carry the CSI report. The subframe in which the PUSCH is transmitted is implicitly signaled as done for normal PUSCH transmission (i.e. n+4 relation, where n is the subframe carrying an uplink grant and n+4 is the subframe for PUSCH transmission) or explicitly signaled.

Figure 9:
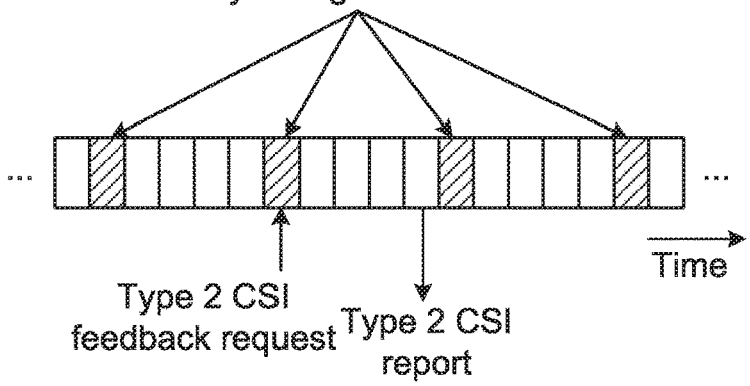
FIG. 9 is a schematic block diagram of another embodiment of a series of subframes for triggering high-resolution CSI feedback, in accordance with the present disclosure.

In another embodiment, the CSI measurement and CSI report requests may be combined and transmitted by the eNB 3 in the same subframe via a UL grant. An example of triggering a high resolution CSI feedback with single request is shown in FIG. 9. In this case, the UL grant is transmitted in a CSI-RS subframe. When the implicit PUSCH transmission timing is used, a UE 6 completes CSI measurement and reports in 4 subframes. Otherwise, an explicit signaling of PUSCH transmission subframe associated with the uplink grant may be used.

Figure 10:
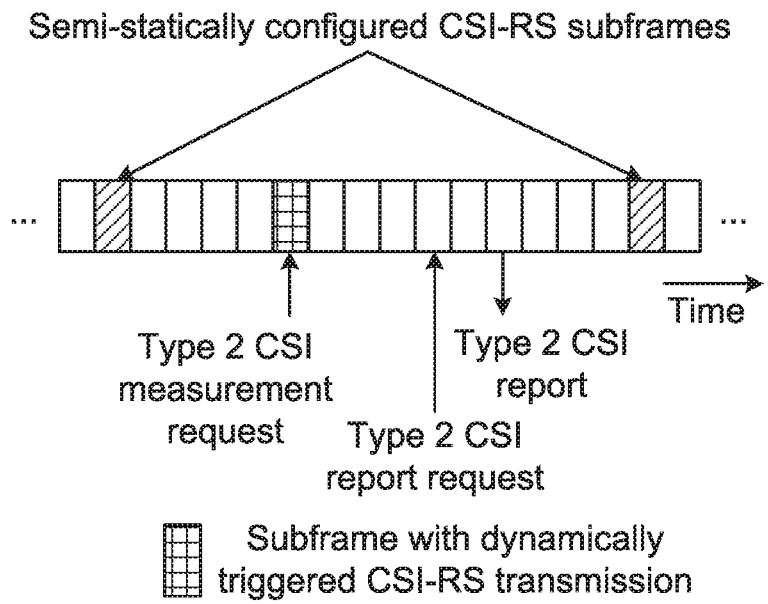
FIG. 10 is a schematic block diagram of an embodiment of a series of subframes for triggering an aperiodic CSI-RS transmission and high-resolution CSI feedback, in accordance with the present disclosure.

In some embodiments of multi-resolution CSI reporting based on CSI-RS in subframes other than the semi-statically configured CSI-RS subframes, aperiodic CSI-RS transmission in any subframe may also be supported, in which CSI-RS transmission is not limited to the configured CSI-RS subframes. A CSI-RS transmission in subframes other than the configured CSI-RS subframes may be triggered by a CSI measurement request. In this case, a CSI measurement request is transmitted in the same subframe in which the CSI-RS is transmitted. An example of triggering of an aperiodic CSI-RS transmission and high resolution CSI feedback using two requests is shown in FIG. 10.

When a CSI measurement request is received in a subframe, a UE 6 measures CSI based on the CSI-RS transmitted in the subframe. The type of CSI is indicated in the CSI measurement request.

A CSI report request may be sent in a subframe after the CSI measurement request to the UE to report the measured CSI.

Figure 11:
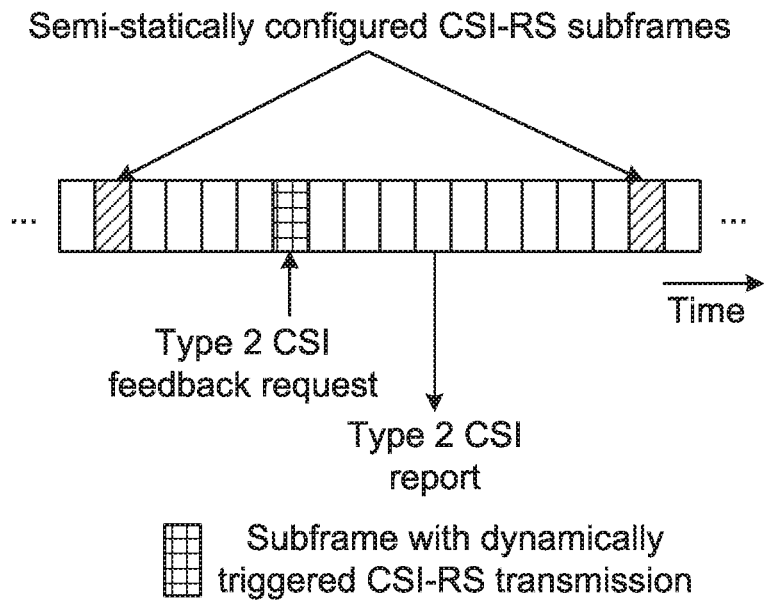
FIG. 11 is a schematic block diagram of another embodiment of a series of subframes for triggering an aperiodic CSI-RS transmission and high-resolution CSI feedback, in accordance with the present disclosure.

Alternatively, the CSI measurement request and the CSI report request may be combined and transmitted in an uplink grant in the same subframe in which a CSI-RS is transmitted. An example of triggering an aperiodic CSI-RS transmission and high resolution CSI feedback using a single request is shown in FIG. 11.

In another embodiment, the high resolution feedback is requested also based on traffic type. For example, for burst traffic with short packets, the delay incurred in the aperiodic high resolution report could mean that MU-MIMO is not worth the effort. For a pair of candidate users, e.g. UEs 6, one or both user-buffers could be flushed before there is a chance to co-schedule them. In contrast, for more sustained traffic, there may still be a chance to co-schedule before the buffers are flushed.

Figure 12:
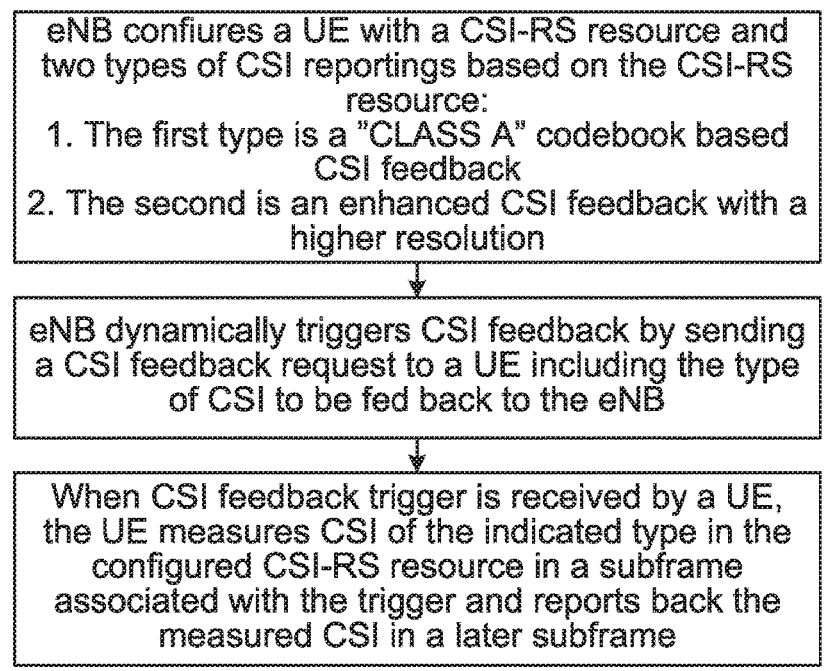
FIG. 12 is a schematic flow chart of example embodiments of a method in accordance with the present disclosure.

FIG. 12 is a flow chart illustrating different embodiments of a method of the present disclosure.

In a first step, an eNB 3 configures a UE 6 with two types of CSI reporting based on a CSI-RS resource:
1. The first type is a "CLASS A" codebook based CSI feedback.
2. The second is an enhanced CSI feedback with a higher resolution.

In a second step, the eNB 3 dynamically triggers CSI feedback by sending a CSI feedback request to a UE 6, the request including the type of CSI to be fed back to the eNB.

In a third step, when the CSI feedback trigger (CSI feedback request) is received by a UE 6, the UE measures CSI of the indicated type in the configured CSI-RS resource in a subframe associated with the trigger and reports back the measured CSI in a later subframe to the eNB 3.

General device and method embodiments of the present disclosure are further discussed below.

Figure 13A:
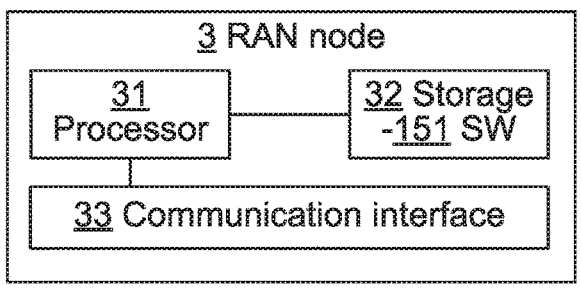
FIG. 13a is a schematic block diagram of an embodiment of a RAN node, in accordance with the present disclosure.

FIG. 13a schematically illustrates an embodiment of a RAN node 3 of the present disclosure. The RAN node 3 comprises processor circuitry 31 e.g. a central processing unit (CPU). The processor circuitry 31 may comprise one or a plurality of processing units in the form of microprocessor(s). However, other suitable devices with computing capabilities could be comprised in the processor circuitry 31, e.g. an application specific integrated circuit (ASIC), a field programmable gate array (FPGA) or a complex programmable logic device (CPLD). The processor circuitry 31 is configured to run one or several computer program(s) or software (SW) 151 (see also FIG. 15) stored in a storage 32 of one or several storage unit(s) e.g. a memory. The storage unit is regarded as a computer readable means 152 (see FIG. 15) as discussed herein and may e.g. be in the form of a Random Access Memory (RAM), a Flash memory or other solid state memory, or a hard disk, or be a combination thereof. The processor circuitry 31 may also be configured to store data in the storage 32, as needed. The RAN node 3 also comprises a communication interface 33, e.g. comprising antenna(s) or antenna element(s) 5 and corresponding antenna ports as discussed herein, as well as transmitter and receiver means for wireless (radio) communication with radio devices 6 and possibly for wired or wireless communication with other nodes in the communication system 1 e.g. other RAN nodes or nodes of a core network.

Figure 13B:
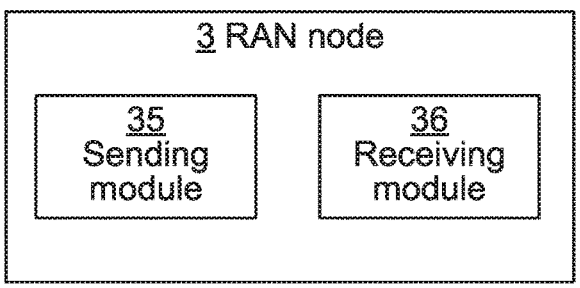
FIG. 13b is a schematic functional block diagram of an embodiment of a RAN node, in accordance with the present disclosure.

FIG. 13b is a schematic block diagram functionally illustrating an embodiment of the RAN node 3 in FIG. 13a. As previously mentioned, the processor circuitry 31 may run software 151 for enabling the RAN node 3 to perform an embodiment of a method of the present disclosure, whereby functional modules may be formed in RAN node e.g. in the processor circuitry 31 for performing the different steps of the method. These modules are schematically illustrated as blocks within the RAN node 3. Thus, the RAN node 3 comprises a sending module 35 (e.g. comprised in or in cooperation with the communication interface 33) for sending, to the radio device 6, information about a first CSI type and a second CSI type for feedback, as well as for sending, e.g. dynamically, to the radio device 6, a CSI feedback request for CSI measurement and feedback of the first CSI type or the second CSI type. The RAN node also comprises a receiving module 34 (e.g. comprised in or in cooperation with the communication interface 33) for receiving, from the radio device 6, a CSI report of the requested CSI type.

Figure 14A:
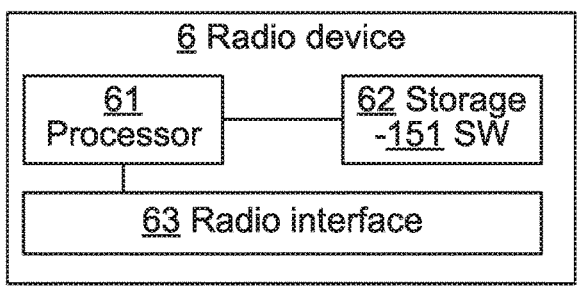
FIG. 14a is a schematic block diagram of an embodiment of a radio device, in accordance with the present disclosure.

FIG. 14a schematically illustrates an embodiment of a radio device 6 of the present disclosure. The radio device 6 comprises processor circuitry 61 e.g. a central processing unit (CPU). The processor circuitry 61 may comprise one or a plurality of processing units in the form of microprocessor(s). However, other suitable devices with computing capabilities could be comprised in the processor circuitry 61, e.g. an application specific integrated circuit (ASIC), a field programmable gate array (FPGA) or a complex programmable logic device (CPLD). The processor circuitry 61 is configured to run one or several computer program(s) or software (SW) 151 (see also FIG. 15) stored in a storage 62 of one or several storage unit(s) e.g. a memory. The storage unit is regarded as a computer readable means 152 (see FIG. 15) as discussed herein and may e.g. be in the form of a Random Access Memory (RAM), a Flash memory or other solid state memory, or a hard disk, or be a combination thereof. The processor circuitry 61 may also be configured to store data in the storage 62, as needed. The radio device 6 also comprises a radio interface 63, e.g. comprising antenna(s) or antenna element(s) 7 and corresponding antenna ports as discussed herein, as well as transmitter and receiver means for wireless (radio) communication with a RAN node 3.

Figure 14B:
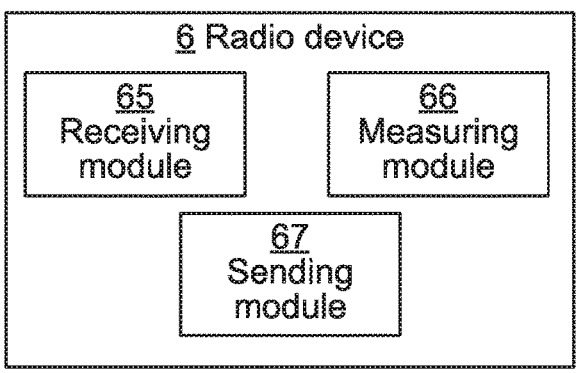
FIG. 14b is a schematic functional block diagram of an embodiment of a radio device, in accordance with the present disclosure.

FIG. 14b is a schematic block diagram functionally illustrating an embodiment of the radio device 6 in FIG. 14a. As previously mentioned, the processor circuitry 61 may run software 151 for enabling the radio device 6 to perform an embodiment of a method of the present disclosure, whereby functional modules may be formed in radio device 6 e.g. in the processor circuitry 61 for performing the different steps of the method. These modules are schematically illustrated as blocks within the radio device 6. Thus, the radio device 6 comprises a receiving module 65 (e.g. comprised in or in cooperation with the radio interface 63) for receiving, from the RAN node 3, information about a first CSI type and a second CSI type for feedback, as well as for receiving, e.g. dynamically, from the RAN node 3, a CSI feedback request for CSI measurement and feedback of the first CSI type or the second CSI type. The radio device 6 also comprises a measuring module 66 for measuring CSI of the indicated type based on signals received on a CSI-RS resource. The radio device 6 also comprises a sending module 67 (e.g. comprised in or in cooperation with the radio interface 63) for sending, to the RAN node 3, a CSI report of the requested CSI type.

Figure 15:
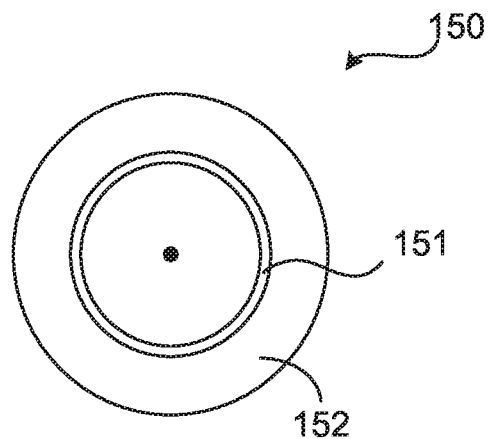
FIG. 15 is a schematic illustration of an embodiment of a computer program product, in accordance with the present disclosure.

FIG. 15 illustrates an embodiment of a computer program product 150. The computer program product 150 comprises a computer readable (e.g. non-volatile and/or non-transitory) medium 152 comprising software/computer program 151 in the form of computer-executable components. The computer program 151 may be configured to cause a device, e.g. a RAN node 3 or a radio device 6 as discussed herein, to perform an embodiment of a method of the present disclosure. The computer program may be run on the processor circuitry 31/61 RAN node 3/radio device 6 for causing it to perform the method. The computer program product 150 may e.g. be comprised in a storage unit or memory 32/62 comprised in the RAN node 3/radio device 6 and associated with the processor circuitry 31/61. Alternatively, the computer program product 150 may be, or be part of, a separate, e.g. mobile, storage means/medium, such as a computer readable disc, e.g. CD or DVD or hard disc/drive, or a solid state storage medium, e.g. a RAM or Flash memory. Further examples of the storage medium can include, but are not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Embodiments of the present disclosure may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

Figure 16:
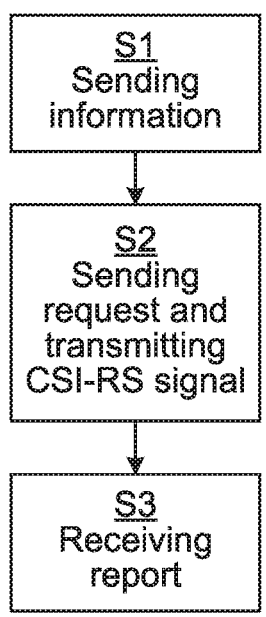
FIG. 16 is a schematic flow chart of an embodiment of a method performed by a RAN node, in accordance with the present disclosure.

FIG. 16 is a schematic flow chart of an embodiment of a method performed in/by a RAN node 3, in accordance with the present disclosure, for CSI feedback in a communication system 1 comprising the RAN node 3 provided with multiple transmit antenna ports 5 for transmitting data to a radio device 6. The method comprises sending S1, to the radio device 6, information about a first CSI type and a second CSI type for feedback. The method also comprises sending S2, e.g. dynamically, to the radio device 6, a CSI feedback request for CSI measurement and feedback of the first CSI type or the second CSI type. The method also comprises receiving S3, from the radio device 6, a CSI report of the requested CSI type.

Figure 17:
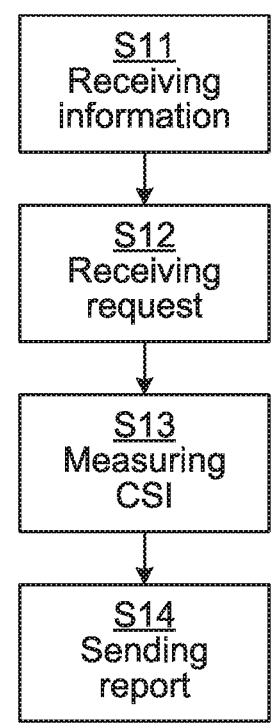
FIG. 17 is a schematic flow chart of an embodiment of a method performed by a radio device, in accordance with the present disclosure.

FIG. 17 is a schematic flow chart of an embodiment of a method performed in/by a radio device 6, in accordance with the present disclosure, for CSI feedback in a communication system 1 comprising a RAN node 3. The method comprises receiving S11, from the RAN node 3, information about a first CSI type and a second CSI type for feedback. The method also comprises receiving S12, e.g. dynamically, from the RAN node 3, a CSI feedback request for CSI measurement and feedback of the first CSI type or the second CSI type. As used herein, dynamic transmission and reception may involve a Physical Downlink Control Channel (PDCCH). The method also comprises measuring S13 CSI of the indicated type based on signals received on a CSI-RS resource. The method also comprises sending S14, to the RAN node 3, a CSI report of the requested CSI type.

Below follows an itemized list of embodiments of the present disclosure:

1. A method of CSI feedback in a communication system 1 comprising a RAN node 3 provided with multiple transmit antenna ports 5 for transmitting data to a radio device 6, the method comprising:

sending, by the RAN node 3 to the radio device 6, information about a first CSI type and a second CSI type for feedback;

sending, e.g. dynamically, by the RAN node 3 to the radio device 6, a CSI feedback request for CSI measurement and feedback of the first CSI type or the second CSI type;

measuring, by the radio device 6, CSI of the indicated type based on signals received on a CSI-RS resource; and receiving, by the RAN node 3 from the radio device 6, a CSI report of the requested CSI type.

2. A method performed by a RAN node 3 for CSI feedback in a communication system 1 comprising the RAN node 3 provided with multiple transmit antenna ports 5 for transmitting data to a radio device 6, the method comprising:

sending S1, to the radio device 6, information about a first CSI type and a second CSI type for feedback;

sending S2, e.g. dynamically, to the radio device 6, a CSI feedback request for CSI measurement and feedback of the first CSI type or the second CSI type; and receiving S3, from the radio device 6, a CSI report of the requested CSI type.

3. A method performed by a radio device 6 for CSI feedback in a communication system 1 comprising a RAN node 3, the method comprising:

receiving S11, from the RAN node 3, information about a first CSI type and a second CSI type for feedback;

receiving S12, e.g. dynamically, from the RAN node 3, a CSI feedback request for CSI measurement and feedback of the first CSI type or the second CSI type;

measuring S13 CSI of the indicated type based on signals received on a CSI-RS resource; and sending S14, to the RAN node 3, a CSI report of the requested CSI type.

4. The method of any preceding item, wherein the information also comprises information about a transmit antenna port layout used in the RAN node and/or about the CSI-RS resource (e.g. an NZP CSI-RS resource) over which CSI-RS signals are to be transmitted.

5. The method of any preceding item, wherein the second CSI type has a different, e.g. a higher, channel resolution than the first CSI type.

6. The method of any preceding item, wherein the first CSI type is based on an LTE release 13 Class A codebook.

7. The method of any preceding item, wherein the second CSI type is an enhanced CSI based on an enhanced codebook 8. The method of any preceding item, wherein the second CSI type is an enhanced CSI based on explicit quantization of an estimated channel.

9. The method of any preceding item, wherein the first and second CSI types are configured in the same CSI process or in two different CSI processes.

10. The method of any preceding item, wherein the CSI feedback request comprises or consists of a CSI measuring request and a CSI report request.

11. The method of item 10, wherein the CSI measuring request is transmitted before the CSI report request.

12. The method of any preceding item, wherein the CSI feedback request contains a CSI type indicator.

13. The method of any preceding item, wherein the CSI feedback request for the second CSI type is only sent/received when it has been determined, e.g. by the RAN node 3, that the radio device 6 is a candidate for MU-MIMO transmission.

14. A computer program product 150 comprising computer-executable components 151 for causing a device, such as the communication system 1, the RAN node 3 and/or the radio device 6 to perform the method of any preceding item when the computer-executable components are run on processor circuitry 31 and/or 61 comprised in the device.

15. A communication system 1 comprising:

processor circuitry 31 and 61; and storage 32 and 62 storing instructions 151 executable by said processor circuitry whereby said system is operative to:

send, by a RAN node 3 comprised in the communication system to a radio device 6 comprised in the communication system, information about a first CSI type and a second CSI type for feedback;

send, e.g. dynamically, by the RAN node 3 to the radio device 6, a CSI feedback request for CSI measurement and feedback of the first CSI type or the second CSI type;

measure, by the radio device 6, CSI of the indicated type based on signals received on a CSI-RS resource; and receive, by the RAN node 3 from the radio device 6, a CSI report of the requested CSI type.

The communication system 1 may be configured for performing any embodiment/item of the method performed in a communication system discussed herein.

16. A RAN node 3 for CSI feedback in a communication system 1 comprising the RAN node 3 provided with multiple transmit antenna ports 5 for transmitting data to a radio device 6, the RAN node comprising:

processor circuitry 31; and storage 32 storing instructions 151 executable by said processor circuitry whereby said RAN node is operative to:

send, to the radio device 6, information about a first CSI type and a second CSI type for feedback;

send, e.g. dynamically, to the radio device 6, a CSI feedback request for CSI measurement and feedback of the first CSI type or the second CSI type; and receive, from the radio device 6, a CSI report of the requested CSI type.

The RAN node 3 may be configured for performing any embodiment/item of the method performed by a RAN node discussed herein.

17. A radio device 6 for CSI feedback in a communication system 1 comprising a RAN node 3, the radio device comprising:

processor circuitry 61; and storage 62 storing instructions 151 executable by said processor circuitry whereby said radio device is operative to:

receive, from the RAN node 3, information about a first CSI type and a second CSI type for feedback;

receive, e.g. dynamically, from the RAN node 3, a CSI feedback request for CSI measurement and feedback of the first CSI type or the second CSI type;

measure CSI of the indicated type based on signals received on a CSI-RS resource; and send, to the RAN node 3, a CSI report of the requested CSI type.

The radio device 6 may be configured for performing any embodiment/item of the method performed by a radio device discussed herein.

18. A computer program 151 for CSI feedback in a communication system 1 comprising a RAN node 3 provided with multiple transmit antenna ports 5 for transmitting data to a radio device 6, the computer program comprising computer program code which is able to, when run on processor circuitry 31 and/or 61 of the communication system, cause the communication system to:

send, by a RAN node 3 comprised in the communication system to a radio device 6 comprised in the communication system, information about a first CSI type and a second CSI type for feedback;

send, e.g. dynamically, by the RAN node 3 to the radio device 6, a CSI feedback request for CSI measurement and feedback of the first CSI type or the second CSI type;

measure, by the radio device 6, CSI of the indicated type based on signals received on a CSI-RS resource; and receive, by the RAN node 3 from the radio device 6, a CSI report of the requested CSI type.

19. A computer program 151 for CSI feedback in a communication system 1 comprising a RAN node 3 provided with multiple transmit antenna ports 5 for transmitting data to a radio device 6, the computer program comprising computer program code which is able to, when run on processor circuitry 31 of the RAN node, cause the RAN node to:

send S1, to the radio device 6, information about a first CSI type and a second CSI type for feedback;

send S2, e.g. dynamically, to the radio device 6, a CSI feedback request for CSI measurement and feedback of the first CSI type or the second CSI type; and receive S3, from the radio device 6, a CSI report of the requested CSI type.

20. A computer program 151 for CSI feedback in a communication system 1 comprising a RAN node 3 provided with multiple transmit antenna ports 5 for transmitting data to a radio device 6, the computer program comprising computer program code which is able to, when run on processor circuitry 61 of the radio device, cause the radio device to:

receive S11, from the RAN node 3, information about a first CSI type and a second CSI type for feedback;

receive S12, e.g. dynamically, from the RAN node 3, a CSI feedback request for CSI measurement and feedback of the first CSI type or the second CSI type;

measure S13 CSI of the indicated type based on signals received on a CSI-RS resource; and send S14, to the RAN node 3, a CSI report of the requested CSI type.

21. A computer program product 150 comprising a computer program 151 according to any item 18-20 and a computer readable means 152 on which the computer program is stored.

Modifications and other variants of the described items or embodiment(s) will come to mind to one skilled in the art having the benefit of the teachings presented in the foregoing descriptions and the associated drawings. Therefore, it is to be understood that the embodiment(s) is/are not to be limited to the specific examples disclosed and that modifications and other variants are intended to be included within the scope of this disclosure. Although specific terms may be employed herein, they are used in a generic and descriptive sense only and not for purposes of limitation.

The communication system 1 may be configured for performing any embodiment of the method performed in a communication system discussed herein.

The RAN node 3 may be configured for performing any embodiment of the method performed by a RAN node discussed herein.

The radio device 6 may be configured for performing any embodiment of the method performed by a radio device discussed herein.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method performed by a radio device for Channel State Information, CSI, feedback in a communication system comprising a Radio Access Network, RAN, node, the method comprising:

receiving, from the RAN node, information about a Channel State Information Reference Signal, CSI-RS, resource, a first CSI type and a second CSI type for feedback based on the CSI-RS resource;

receiving, from the RAN node, a CSI feedback request for CSI measurement and feedback of the first CSI type or the second CSI type;

measuring the CSI of the indicated type based on signals received in the CSI-RS resource; and sending, to the RAN node, a CSI report of the requested CSI type.

2. The method of claim 1, wherein the CSI feedback request is dynamically received.

3. The method of claim 1, wherein the information also comprises information about a transmit antenna port layout used in the RAN node.

4. The method of claim 3, wherein the information also comprises information about a first codebook for the first CSI type and a second codebook for the second CSI type.

5. The method of claim 4, wherein the first codebook and the second code book are both associated with a same antenna port layout.

6. The method of claim 4, wherein the first codebook and the second code book are different.

7. The method of claim 1, wherein the CSI-RS resource is a Non-Zero Power, NZP, CSI-RS resource.

8. The method of claim 1, wherein the information further comprises information about a Zero Power, ZP, CSI-RS resource over which interference is to be measured.

9. The method of claim 1, wherein the information is received semi-statically, such as over Radio Resource Control, RRC.

10. The method of claim 1, wherein the second CSI type has a higher channel resolution than the first CSI type.

11. The method of claim 1, wherein the first CSI type is based on a first codebook.

12. The method of claim 11, wherein the first codebook is a Long Term Evolution, LTE, Class-A codebook.

13. The method of claim 1, wherein the second CSI type is based on a second codebook.

14. The method of claim 13, wherein the second codebook is an enhanced codebook with respect to a first codebook.

15. The method of claim 1, wherein a second codebook provides richer CSI than a first codebook.

16. The method of claim 1, wherein the second CSI type is an enhanced CSI based on explicit quantization of an estimated channel.

17. The method of claim 1, wherein the first and second CSI types are configured in a same CSI process.

18. The method of claim 1, wherein the first and second CSI types are configured in two different CSI processes.

19. The method of claim 18, wherein the two CSI processes have a same CSI-RS resource configuration.

20. The method of claim 1, wherein the CSI-RS is transmitted in a same subframe as the CSI feedback request.

* * * * *

UNITED STATES PATENT AND TRADEMARK OFFICE
CERTIFICATE OF CORRECTION

PATENT NO. : 11,070,272 B2  
APPLICATION NO. : 16/566426  
DATED : July 20, 2021  
INVENTOR(S) : Gao et al.

Page 1 of 1

It is certified that error appears in the above-identified patent and that said Letters Patent is hereby corrected as shown below:

In the Specification

In Column 1, Line 37, delete "a" and insert -- $\alpha$ --, therefor.

In Column 1, Line 42, delete "OFDM" and insert -- 7 OFDM --, therefor.

In Column 2, Line 7, delete "OFDM" and insert -- 3 OFDM --, therefor.

Signed and Sealed this  
Nineteenth Day of April, 2022

Katherine Kelly Vidal  
*Director of the United States Patent and Trademark Office*